United States Patent
Wise

(10) Patent No.: US 6,708,461 B1
(45) Date of Patent: Mar. 23, 2004

(54) PINCH CLAMP

(76) Inventor: Robert W. Wise, 365 Ely Rd., Petaluma, CA (US) 94954

( * ) Notice: Subject to any disclaimer, the term of this patent is extended or adjusted under 35 U.S.C. 154(b) by 0 days.

(21) Appl. No.: 10/123,924

(22) Filed: Apr. 15, 2002

(51) Int. Cl.[7] ................................................. F16B 15/00
(52) U.S. Cl. .......................... 52/700; 52/698; 411/473; 411/475; 411/492; 411/921
(58) Field of Search ................. 52/586.1, 698, 52/700, 703, 712, 714; 411/471, 473, 475, 492, 496, 494, 457, 921, 459, 460, 920, 470, 472, 487, 439

(56) References Cited

U.S. PATENT DOCUMENTS

| | | | | |
|---|---|---|---|---|
| 29,472 A | * | 8/1860 | Hughes et al. | 362/180 |
| 294,777 A | * | 3/1884 | Forbes | 411/471 |
| 426,893 A | * | 4/1890 | Wildemore | 411/471 |
| 862,189 A | * | 8/1907 | Olsen | 411/471 |
| 925,638 A | * | 6/1909 | Kerr | 36/67 C |
| 1,348,142 A | * | 7/1920 | Jaeger | 411/473 |
| 1,639,530 A | * | 8/1927 | Payson | 411/471 |
| 1,790,348 A | * | 1/1931 | Jewell | 411/471 |
| 2,034,080 A | * | 3/1936 | Bitzenburger | 403/249 |
| 3,107,390 A | * | 10/1963 | Shelton | 16/224 |
| 5,865,586 A | * | 2/1999 | Neville | 411/459 |
| D427,896 S | * | 7/2000 | Pezzella | D8/390 |

* cited by examiner

*Primary Examiner*—Carl D. Friedman
*Assistant Examiner*—Brian E. Glessner
(74) *Attorney, Agent, or Firm*—Seed IP Law Group PLLC

(57) ABSTRACT

A pinch clamp for clamping or drawing together building materials is disclosed having an elongated connecting bar having first and second ends, and first and second pyramidal prongs. Each prong has a triangular base, a distal tip, an inner flat tapered side and two outer sides defining a wedge shape, the base of the first prong connected at the base to the first end of the connecting bar the base of the second prong connected at the base to the second end of the connecting bar with the inner tapered sides facing each other.

7 Claims, 2 Drawing Sheets

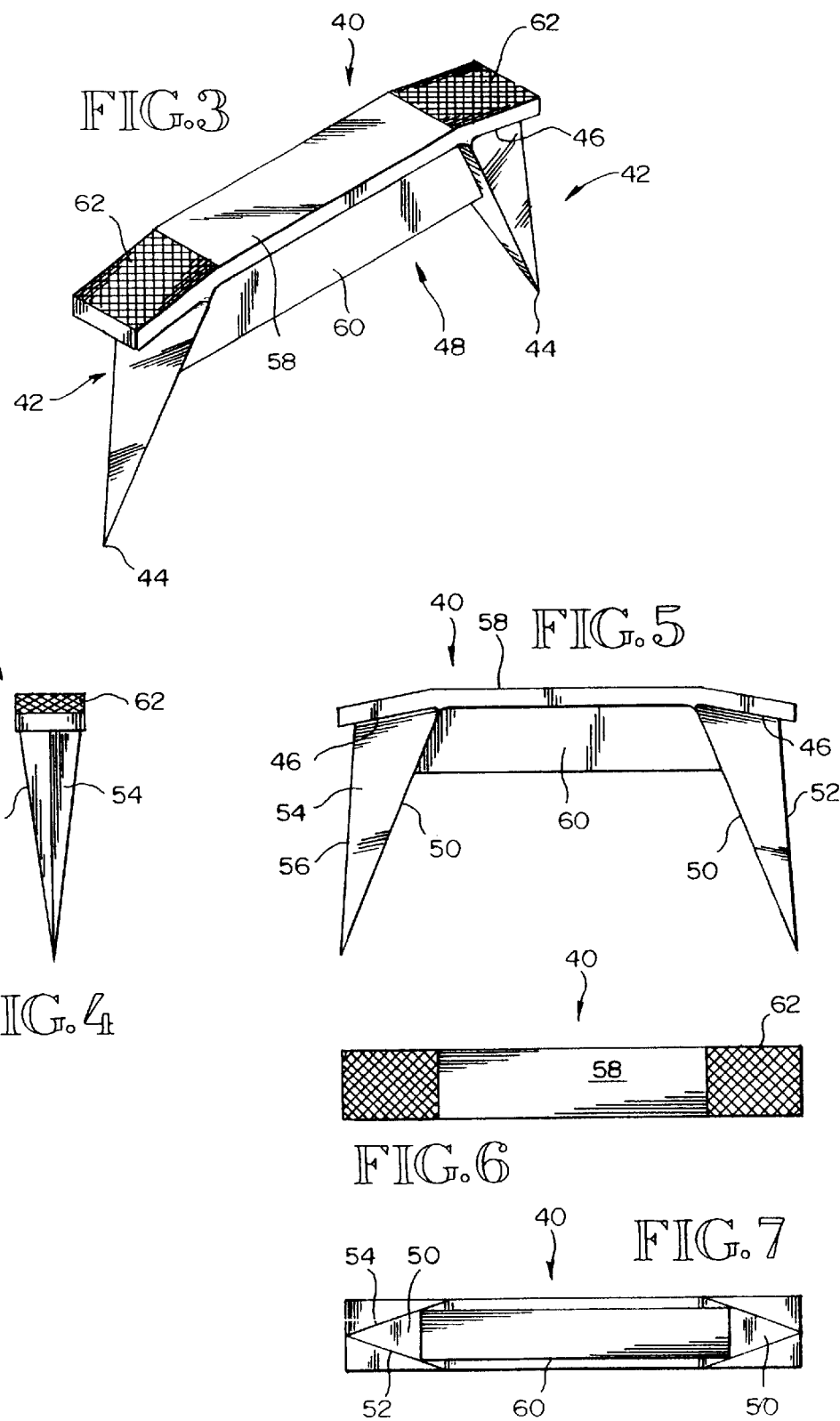

PINCH CLAMP

TECHNICAL FIELD

The invention generally relates to construction tools for clamping together and relative spacial adjustment of building materials for their installation in the construction or remodeling of building structures. More specifically, the invention relates to pinch clamps which are driven into two pieces of building material to draw the pieces together allowing their proper attachment together or to a substrate.

BACKGROUND OF THE INVENTION

In the construction and remodeling of building structures, such as houses or offices, many times two pieces of building materials need to be installed abutting one another. In many of these situations, using a traditional clamp (e.g., a pipe clamp), which grips the far edges of each piece of building material and forces the near edges together, is impractical or impossible. For example, when two boards are connected end to end, the combined length may be either too large for available traditional clamps or may make the use of traditional clamps excessively cumbersome for the installer. In addition, when attaching a piece of building material to another already installed piece, there may not be two opposite edges available for the traditional clamp to grips such as when assembling a countertop substrate.

The pinch clamp does not have these limitations. A pinch clamp is a small hand tool that has two prongs connected with a crossbar. An example of the prior art pinch clamp can be seen in FIGS. 1 and 2 (prior art). The prior art pinch clamp 10 has two prongs 12 connected by an elongated connecting bar 14. The prongs 12 are attached to the connecting bar 14 at a base 16 and have chisel edged tips 18 opposite the base 16. As can be seen in FIG. 2 (prior art), the chisel edged tips 18 of the prongs 12 do not come to a point but have a chisel edge 20. The prong 12 has inwardly tapered inner sides 22 and vertical outer sides 24. In practice, the chisel edged tips 18 of the pinch clamp are driven, usually by a hammer, into pieces of building material to be clamped. The hammer strikes the top prong end 26 of the connecting bar 14. If the hammer impacts the top middle portion 28 of the connecting bar 14, the connecting bar 14 may be bent and the pinch clamp 10 will no longer function properly.

Each prong 12 makes a hole in the building material by first inserting a chisel edged tip 18 into the building material and compressing the material surrounding the hole as the inwardly tapered inner side 22 and vertical outer side 24 are driven deeper. The inwardly tapered inner sides 22 of the prongs 12 force the two pieces of building materials together. The midpoint of the prong 12 between the inwardly tapered inner side 22 and the vertical outer side 24 is progressively closer to the center of the pinch clamp 10 along the connecting bar 14 the further up the prong 12 one gets from the chiseled edged tip 20. Since the building materials compress on both sides of each prong 12 and the midpoint of the prongs are closer to the middle of the pinch clamp 10 as the prongs are driven more deeply into the building materials, the two pieces of building material are thereby clamped together. The hole in the building material is usually filled or otherwise patched unless the building material is to be covered by another material.

While the prior art pinch clamp is widely used, it has several disadvantages. The connecting bar of the prior art pinch clamp may be bent if it is struck with the hammer in a place other than directly at a top end of the pinch clamp above one of the prongs. Further, the pinch clamp is narrow in width, making it easy to entirely miss the pinch clamp with the hammer or to drive the pinch clamp in at an angle other than the desired vertical. In addition, the prior art prongs must be driven rather deeply into the building material in order to cause a significant amount of relative movement or clamping force. Further, when the prior art clamp is driven deeply into the building material, it can be difficult to remove the pinch clamp without damaging the building material further or damaging the pinch clamp.

SUMMARY OF THE INVENTION

Therefore, it is an object of the invention to provide a pinch clamp which resists bending if struck other than directly above one of the prongs.

It is a still further object of the invention to provide a pinch clamp that provides increased clamping force compared to the prior art clamp when driven to the same depth in the building material.

A further object of the invention is to provide a pinch clamp that resists damage from a hammer blow to a portion of the pinch clamp other than directly over a prong.

A still further object of the invention is to provide a larger surface for being impacted with a hammer to ensure the pinch clamp is driven vertically into the building material.

A still further object of the invention is to provide a pinch clamp that can be more readily removed from the building material without damage to the pinch clamp or the building material.

The present invention achieves the above-described objects and advantages, and other objects and advantages which will become apparent from the description which follows, by providing a pinch clamp having two elongated, pyramidal prongs connected by a stiffening beam or connecting bar. Each prong has a triangular base connected to the distal ends of the stiffening beam, a distal pointed tip, an inner flat tapered side, and two outer sides defining a wedge shape. The base of the first prong is connected at its base to the first end of the connecting bar, and the base of the second prong is connected at its base to the second end of the connecting bar. The inner, flat, tapered sides of each prong face each other.

In the preferred embodiment of the present invention, the connecting bar has a top surface defining a transverse flange so that the connecting bar forms a stiffening "T"-shaped beam for resisting impact to the connecting bar, such as by a hammer. The preferred embodiment of the current invention also provides a knurled driving surface on each end of the connecting bar for impact by a hammer, allowing the inventive pinch clamp to be driven vertically into the building material. A further embodiment of the present invention comprises at least one removal flange at an end of the connecting bar allowing the removal of the inventive pinch clamp without damage to the pinch clamp or further damage to the building materials.

BRIEF DESCRIPTION OF THE DRAWINGS

FIG. 3 is a front perspective view of the preferred embodiment of the inventive pinch clamp.

FIG. 4 is a front elevation view of the preferred embodiment of the inventive pinch clamp.

FIG. 5 is a side elevation view of the preferred embodiment of the inventive pinch clamp.

FIG. 6 is a top plan view of the preferred embodiment of the inventive pinch clamp.

FIG. 7 is a bottom plan view of the preferred embodiment of the inventive pinch clamp.

DETAILED DESCRIPTION OF THE PREFERRED EMBODIMENTS

Figure 1:
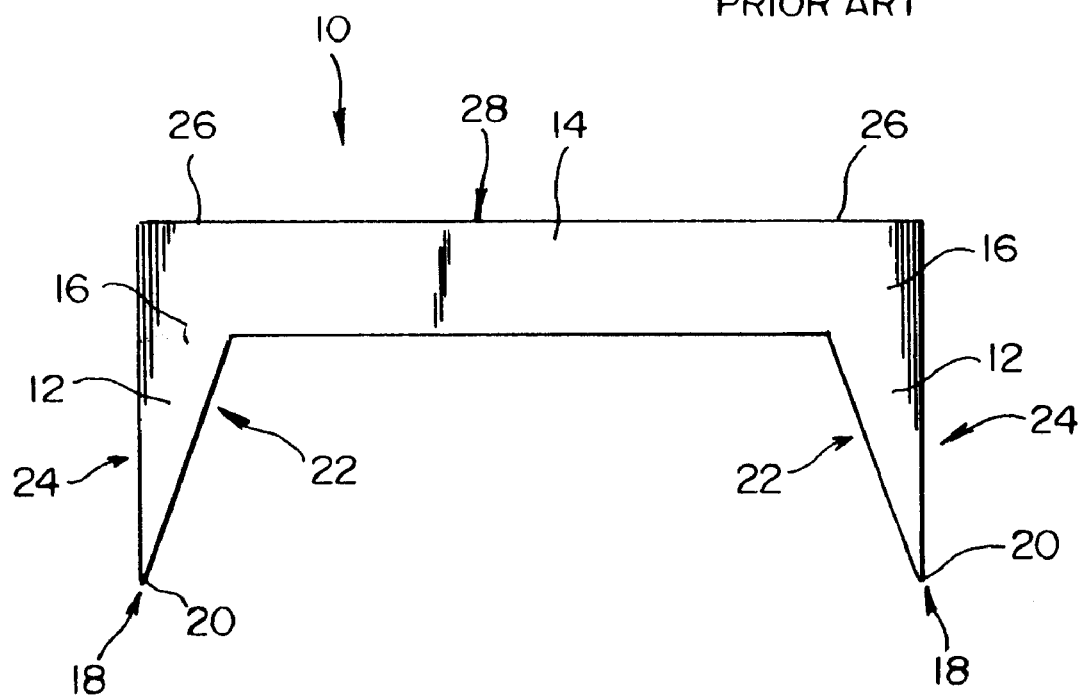
FIG. 1 (prior art) is a side elevation view of the prior art pinch clamp.
Figure 2:
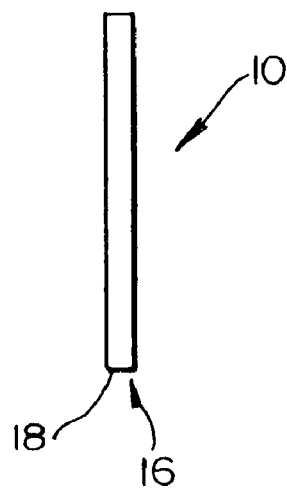
FIG. 2 (prior art) is a front elevation view of the prior art pinch clamp.

A pinch clamp, in accordance with the principles of the invention, is generally indicated at reference numeral 40 in FIGS. 3 through 7 of the attached drawings, wherein similar reference characters denote corresponding features. The pinch clamp 40 has first and second elongated, pyramidal-shaped prongs 42. Each pyramidal prong 42 has a distal tip 44 and a triangular base 46. The base of each prong is connected at ends of a connecting bar generally indicated at reference numeral 48. Each pyramidal prong 42 has an inner flat tapered side 50 which, as can be seen especially in FIG. 7, increases in width from the distal tip 44 of each prong 42 to the triangular bases 46. The pyramidal prongs 42 also have two outer sides 52, 54 defining a wedge shape as can be seen especially in FIG. 4 and FIG. 7. The two outer sides 52, 54 meet at approximately 40 degrees, forming a sharp edge 56. The inner flat tapered sides 50 also form sharp edges with the outer sides and have increasing width as the pyramidal prong 42 is driven into the building material. This increasing width of the inner flat tapered side 50 as it extends from the distal tip 44 to the triangular base 46 allows the inventive pinch clamp 40 to have increasing clamping area as the depth that the pinch clamp prong is driven into the building material increases. This increased area allows more clamping pressure to be applied by the inventive pinch clamp 40 at any particular driven depth as compared to the prior art pinch clamp 10. Alternatively, the inventive pinch clamp 40 needs to be driven less deeply into the building material to apply the same clamping pressure as the prior art pinch clamp 10, allowing the inventive pinch clamp 40 to do less damage to the building material. The sharp edges allow the prongs to be easily driven into the material. Thus, the inventive pinch clamp 40 may be satisfactorily used on a relatively thin piece of building material.

As can be seen in FIGS. 3, 5, and 7, the connecting bar 48 has a top surface or flange 58 and a wedge-shaped transverse web 60 forming a stiffening T-beam 62. This configuration of the connecting bar 48 is stronger and therefore more resistant to bending due to hammer impact on the portion of the connecting bar not over the top of the pyramidal prongs 42. The connecting bar 48 further has knurled driving surfaces 62 on the top surface 58 of the connecting bar above the triangular bases 46 of the pyramidal prongs 42. At these ends, the flange 58 is narrowly downwardly angled with respect to the central portion of the flange 58. The downward angle and knurled surface discourages a hammer as it impacts the pinch clamp 40 from slipping off the end of the pinch clamp and damaging the building materials to be clamped.

The downwardly angled ends of the flange 58 further serve as a removal flange at each end of the top surface 58 of the stiffening T-beam 48. This removal flange allows the claws of a claw hammer to grip either end of the pinch clamp 40 and remove it from the building material without further damage to the building materials or the pinch clamp.

It is to be understood that the invention is not limited to the embodiments specifically disclosed, herein, but is to be determined in scope by the claims which follow.

I claim:

1. A pinch clamp for drawing building materials together, comprising:

an elongated connecting bar having first and second ends, and first and second pyramidal prongs, each prong having a triangular base, a distal tip, an inner flat tapered side and two outer sides defining a wedge shape, the base of the first prong connected to the first end of the connecting bar and the base of the second prong connected to the second end of the connecting bar with the inner tapered sides facing each other.

2. The pinch clamp of claim 1, wherein the two outer sides defining a wedge shape meet at approximately a 40 degree angle.

3. The pinch clamp of claim 1, wherein the connecting bar has a transverse top surface defining a laterally extending flange forming a stiffening "T" beam for resisting impact to the connecting bar.

4. The pinch clamp of claim 3, wherein the transverse top surface is downwardly angled at ends thereof so as to form removal flanges at the ends of the connecting bar to facilitate removal of the pinch clamp.

5. The pinch clamp of claim 1, wherein the top surface of the connecting bar has a knurled driving surface, which is downwardly angled with respect to the stiffening beam for being impacted.

6. A pinch clamp for drawing building materials together, comprising:

an elongated connecting bar having first and second ends, a top surface defining a transverse flange forming a stiffening "T" beam for resisting impact to the connecting bar, a knurled driving surface downwardly angled with respect to the connecting bar at an end of the connecting bar forming a removal flange at the first end of the connecting bar to facilitate removal of the pinch clamp by a claw hammer; and, first and second pyramidal prongs, each prong having a triangular base, a distal tip, an inner flat tapered side and two outer sides that meet at angle defining a wedge shape, the base of the first prong connected to the first end of the connecting bar and the base of the second prong connected to the second end of the connecting bar, with the inner tapered sides of each prong facing each other.

7. The pinch clamp of claim 6 wherein the angle is approximately 40 degrees.

* * * * *